United States Patent

Schmidt et al.

[15] 3,652,209
[45] Mar. 28, 1972

[54] PROCESS FOR THE PRODUCTION OF A CYANIC ACID-AMMONIA GAS MIXTURE

[72] Inventors: Alfred Schmidt; Ferdinand Weinrotter; Walter Muller, all of Linz Donau, Austria

[73] Assignee: Osteneichische Stickstoffwerke Aktiengesellschaft, Linz Donau, Austria

[22] Filed: Feb. 26, 1969

[21] Appl. No.: 802,685

[30] Foreign Application Priority Data

Mar. 1, 1968  Austria ................................. 1988/68

[52] U.S. Cl. ................................. 23/151, 23/193
[51] Int. Cl. ........................................ C01c 3/00, C01c 1/00
[58] Field of Search ................... 23/151, 193; 222/566, 544; 71/36, 43

[56] References Cited

UNITED STATES PATENTS 1,869,688  8/1932  Heimann ................................. 71/36

FOREIGN PATENTS OR APPLICATIONS 534,973  12/1956  Canada ..................................... 23/151
974,145  11/1964  Great Britain ........................... 23/151

*Primary Examiner*—Oscar R. Vertiz
*Assistant Examiner*—Hoke S. Miller
*Attorney*—Wenderoth, Lind & Ponack

[57] ABSTRACT

The present invention is directed to a method of producing a gaseous mixture of cyanic acid and ammonia of low cyanuric acid content by introducing molten urea in a fluidized bed of at least 330° C. wherein it is heated to 300° to 480° C. within less than 1 second, the urea being introduced through the injection point with the latter being surrounded concentrically by a blowing gas issuing around the molten urea at a speed between 20 m./sec. to 100 m./sec.

4 Claims, No Drawings

PROCESS FOR THE PRODUCTION OF A CYANIC ACID-AMMONIA GAS MIXTURE

This invention relates to a process for the production of a cyanic acid-ammonia gas mixture from urea.

The manufacture of a cyanic acid-ammonia gas mixture by thermal decomposition of urea blown into a fluidized bed of inert material is known by British Pat. No. 974,145. Various methods of introducing the urea into the fluidized bed are possible.

Thus, for example, it is known to introduce the urea in a solid or liquid form into the decomposition apparatus. It is important for the process that the urea should be evaporated rapidly and without leaving a residue since otherwise cyanuric acid forms, so that the inert particles of the fluidized bed are stuck together by the solid cyanuric acid, which makes the plant incapable of functioning. This difficulty manifests itself to a particular extent in the large scale industrial use of the gasification of urea. In order to ensure perfect evaporation of the urea even in large scale industrial operation, the minimum temperature of above 320° C. must be reached extremely rapidly and the decomposition of the urea must proceed so rapidly that cyanuric acid cannot form. It has been suggested for this purpose to blow urea in a solid form, and in particular in the form of prills, into the fluidized bed from below.

However, a process for the manufacture of melamine from urea is also known in which the more conveniently handled liquid form of urea is blown at supersonic speed, using ammonia as the spraying gas, through a nozzle laterally into the catalyst fluidized bed. The spraying gas and the liquid urea are mixed immediately before blowing through the nozzle aperture. However, this high gas speed on the one hand demands a considerable expenditure of power and on the other hand produces enormous abrasion of the solid particles in the fluidized bed.

It has now been found that in the decomposition of urea to give cyanic acid and ammonia by atomizing liquid urea it is also possible to work at gas speeds below the speed of sound if the gasification of liquid urea is conducted in such a way that the urea melt does not come into contact with surfaces which are below the reaction temperature.

Accordingly the present invention provides a process for the production of a cyanic acid ammonia gas mixture of low cyanuric acid content which comprises blowing molten urea into a fluidized bed of inert material while heating the blown urea to a temperature of 300° to 480° C. within less than 1 second, the fluidized bed being maintained at a temperature of at least 330° C., and the molten urea being introduced simultaneously with a blowing gas which issues concentrically around the injection point or just before the injection point of the molten urea, the blowing gas, when issuing precisely around the molten urea, having a speed of 40 m./sec. to 100 m./sec., and when issuing just before the injection point of the molten urea having a speed of 20 m./sec. to 100 m./sec., and continuously withdrawing the mixture of cyanic acid, blowing gas and ammonia which forms in the fluidized bed.

The process according to the invention is preferably carried out by introducing the molten urea from below, by means of a two-substance nozzle, into the fluidized bed, consisting of finely granular inert material, in a heated fluidized bed reactor.

Ammonia is preferably employed as the blowing gas for atomizing the liquid urea and as the carrier gas for maintaining the fluidized bed. However, nitrogen, carbon dioxide and other gases which are inert towards the reagents are also suitable. The blowing gas as well as the carrier gas must be introduced in an anhydrous state since, as is known, water would immediately decompose the cyanic acid with the formation of carbon dioxide and ammonia.

When atomizing liquid urea care must be taken that the issuing jet of liquid urea is always surrounded by a jacket of blowing gas. If the blowing gas issues precisely around the injection point of the urea, a higher gas speed of the blowing gas is necessary to ensure trouble-free operation of the urea decomposition than in cases where the injection point of the blowing gas is in front of that of the urea melt. The mixing of the blowing gas with the liquid urea must only take place after leaving the nozzle.

A suitable device for carrying out the process comprises a fluidized bed reactor having a bottom plate provided with holes and an inlet for introducing the reagent from below, the said inlet comprising a bore for a two-substance nozzle passing through the bottom plate of the fluidized bed, the nozzle consisting of a central tube for introducing the molten urea and a jacket tube arranged concentrically to the central tube, with the central tube, at the end projecting into the reaction space, either ending at the same level as the jacket tube or projecting a few millimeters beyond the latter. The above device renders mixing within the nozzle and contact with the nozzle wall impossible.

The following Examples illustrate the invention in more detail.

EXAMPLES

An externally heated fluidized bed reactor of 200 mm. diameter and 500 mm. height is filled to a height of 185 mm. with sand of 0.1 to 0.3 mm. diameter. 8,000 l/hour of ammonia at a temperature of 20° C. are blown in as the carrier gas through a frit at the bottom of the reactor. 2 kg./hr. of molten urea at a temperature of 135° C., and the quantity of ammonia specified in Table 1, acting as a blowing gas and at a temperature of 140° C., are introduced from below, via a nozzle of the type defined below, through a central bore in the frit.

The temperature of the fluidized bed is kept at 350° to 370° C.

The two-substance nozzles employed, having a central liquid entry, are of the following dimensions:

| Diameter of the jacket pipe: | internal: | 4.4 mm. |
|---|---|---|
| | external: | 7.3 mm. |
| Diameter of the central pipe: | internal: | 1.85 mm. |
| | external: | 3.3 mm. |

Nozzle 1: Central pipe 2 mm. longer than jacket pipe.
Nozzle 2: Central pipe and jacket pipe of equal length.

TABLE 1

| Nozzle No. | l/hour of blowing gas | Gas speed m./sec. | Notes |
|---|---|---|---|
| 1 | 500 | approx. 21 | Operates perfectly in continuous running |
| | 1000 | approx. 42 | Do. |
| | 1500 | approx. 63 | Do. |
| 2 | 500 | approx. 21 | After 40 minutes encrustation of the solid particles of the fluidized bed. |
| | 1000 | approx. 42 | Operates perfectly in continuous running |
| | 1500 | approx. 63 | Do. |

If the nozzles described are operated out of the reactor, it is seen that the external jacket pipe is in the case of Nozzle 1 not wetted with molten urea in any of the three experiments, whilst in the case of Nozzle 2 it is wetted at its tip when operated with 500 l/hour of ammonia gas.

We claim:

1. In a process for the production of a cyanic acid-ammonia gas mixture by the introduction of urea into a fluidized bed of inert material wherein it is heated to a temperature of 300° to 480° C. within less than 1 second, the improvement which comprises maintaining the fluidized bed at a temperature of at least 330° C. and simultaneously introducing through concentric nozzles at the bottom of said fluidized bed, molten urea through the inner nozzle of said concentric nozzles and a blowing gas through the outer nozzle of said concentric nozzles, the inner nozzle ending at the same level as the outer nozzle so that the blowing gas issues precisely around the injection point of the urea, said blowing gas having a speed of 40 m./sec. to 100 m./sec., the mixture of cyanic acid, blowing gas and ammonia which forms in the fluidized bed being continuously withdrawn.

2. In a process for the production of a cyanic acid-ammonia gas mixture by the introduction of urea into a fluidized bed of inert material wherein it is heated to a temperature of 300° to 480° C. within less than 1 second, the improvement which comprises maintaining the fluidized bed at a temperature of at least 330° C. and simultaneously introducing through concentric nozzles at the bottom of said fluidized bed, molten urea through the inner nozzle of said concentric nozzles and a blowing gas through the outer nozzle of said concentric nozzles, the inner nozzle projecting a few millimeters beyond the outer nozzle so that the blowing gas issues at a point just before the injection point of the urea, said blowing gas having a speed of 20 m./sec. to 100 m./sec., the mixture of cyanic acid, blowing gas and ammonia which forms in the fluidized bed being continuously withdrawn.

3. A process according to claim 1 wherein the blowing gas is ammonia.

4. A process according to claim 2 wherein the blowing gas is ammonia.

\* \* \* \* \*